Sept. 2, 1924.
L. A. OSGOOD
SCALE
Filed May 13, 1921
1,507,419
2 Sheets-Sheet 1

Sept. 2, 1924.  
L. A. OSGOOD  
SCALE  
Filed May 13, 1921  
1,507,419  
2 Sheets-Sheet 2
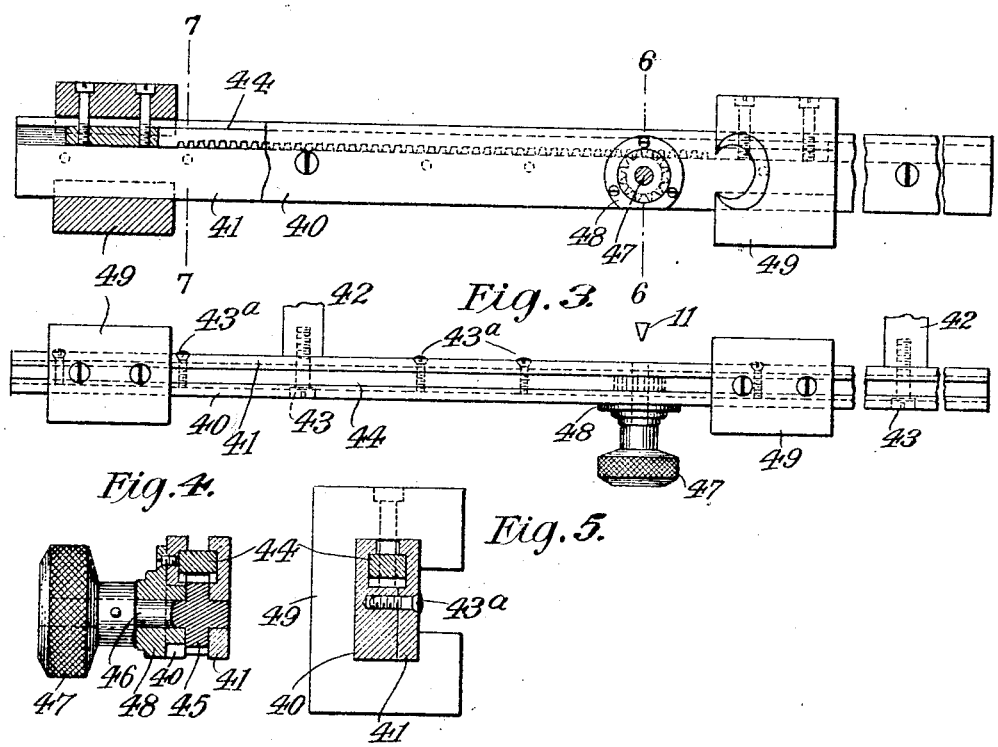
Inventor  
L. A. Osgood  
By his Attorneys  
Kerr Page Cooper & Hayward Patented Sept. 2, 1924.

1,507,419

UNITED STATES PATENT OFFICE.

LOUIS A. OSGOOD, OF DAYTON, OHIO, ASSIGNOR TO INTERNATIONAL SCALE COMPANY, OF DAYTON, OHIO, A CORPORATION OF ILLINOIS.

SCALE.

Application filed May 13, 1921. Serial No. 469,108.

*To all whom it may concern:*

Be it known that I, LOUIS A. OSGOOD, a citizen of the United States, residing at Dayton, in the county of Montgomery and State of Ohio, have invented certain new and useful Improvements in Scales, of which the following is a full, clear, and exact description.

This invention relates more particularly to that class of weighing scales which are employed for weighing comparatively heavy commodities and which have become known in the trade as heavy capacity automatic scales, but it will be obvious from the following description that certain features of the invention are applicable to scales of other types.

While I have described the present invention in connection with a single capacity weight scale or doubling weight device, it will be understood that this has been done merely for illustration and that the invention is not limited in its application to this particular type of scale.

Referring to the drawings:

Fig. 2 is a front view of the cumulative tare bar and poises. Certain parts are broken away and shown in section to show the interior construction.

Fig. 3 is a top plan view of the tare bar and poises.

Figure 1:
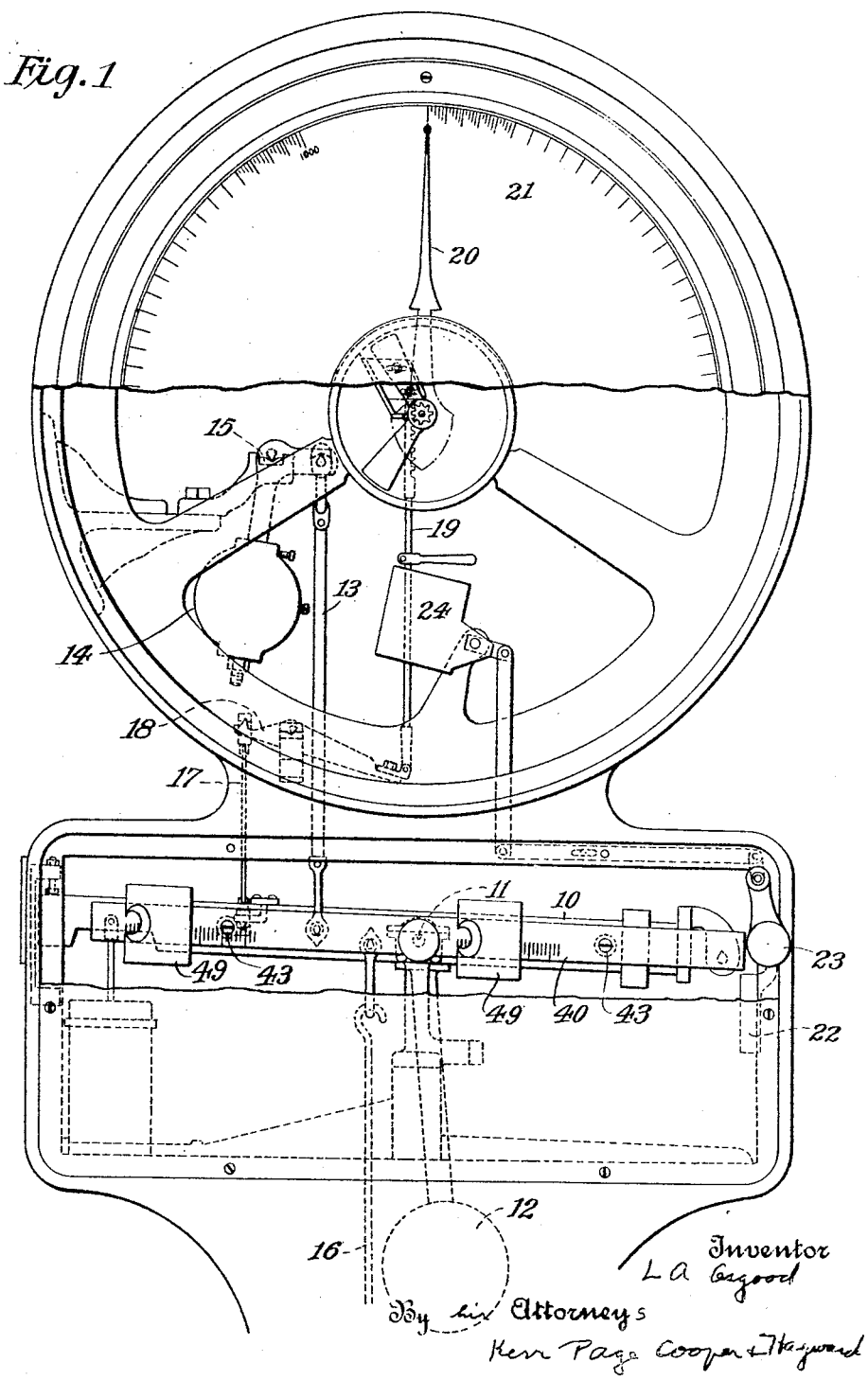
Fig. 1 shows a front elevation of the scale with certain cover plates and dial parts broken away to show the interior construction.

Figs. 4 and 5 are detail sectional views taken respectively on line 6—6 and 7—7 of Fig. 2.

The scale to which my invention is here shown as applied is of a type well known in the art as an International 601 scale, and requires no detailed description. In main, the scale comprises a beam 10 fulcrumed at 11 and having rigidly connected thereto a depending pendulum 12. A suitable linkage 13 connects the beam with a pendulum 14 which is pivoted or otherwise supported in bearings such as 15. Pendulums 12 and 14 constitute the automatic counterbalance for the scale. A draft rod 16 connects the beam with the base lever system and platform (not shown) and suitable connections such as link 17, rocking lever 18 and rack rod 19 variably displace a pivotal indicator or pointer 20 over a dial 21 in accordance with the displacement of the beam, as controlled by the automatic counterbalance. As is customary in scales of this type, the graduation range of the dial corresponds to the range or capacity of the automatic counterbalance. The dial here illustrated is provided with 1000 graduations for 1000 lbs. The weighing capacity of the scale may be increased by the application of a capacity weight 22 to the beam. The weight is applied to the beam by the actuation of handle 23, which positions a supplementary indicator 24 in the usual manner.

In certain classes of weighing operations it is desirable to accumulate tare. For example, in a creamery receiving milk there is provided a weighing scale which carries upon its platform a suitable tank. The milk is received from time to time and placed in this tank. It is desired to ascertain the net weights of each batch of milk as received. It is the practice to first balance off the tare weight of the tank, then to take a dial reading of the weight of the first amount of milk received in the tank. Thereafter the milk already received is considered as tare and is balanced off by adjusting the tare poise. A new dial reading is then taken and the tare again accumulated.

Where cumulative tare operations such as the above are of frequent occurrence, it is desirable that a simple means be provided for setting the poise or poises. The setting means should be of such character that the equilibrium of the beam be disturbed as little as possible.

In Fig. 1 the scale beam 10 is shown as provided with the usual graduated tare beam 40. The tare beam is made in two parts 40 and 41 and is attached to the main beam by brackets 42 and screws 43 (see Fig. 3). The two parts of the tare beam are secured together by screws 43ª and provide a guideway to slidably receive and embrace a rack member 44 having downwardly facing teeth. Coaxially aligned with the main beam pivot 11 is a pinion 45 having bearings in the beam members 40 and 41 (see Fig. 4). The pinion is likewise provided with an extended stud 46 which has fastened thereto a suitable operating member such as the knurled knob 47. An annular disk 48, which is secured by screws to the tare beam 40, provides a supplementary bearing for stud 46.

Slidably mounted upon the tare beams and embracing them, as shown in Fig. 5, are a pair of tare poises 49. These poises are located upon opposite sides of the beam fulcrum and are suitably secured to the rack member 44 by screws (see Fig. 2).

When it is desired to accumulate tare, the knob is grasped by the operator and turned, thereby advancing the rack 44 and relocating the tare poises 49. When the pointer 20 returns to zero further adjustment of the poises is discontinued.

The tare knob being coaxially aligned with the beam fulcrum causes the minimum of disturbance to the equilibrium of the beam during the setting of the poises and permits the carrying out of cumulative tare operations in a most expeditious manner.

I claim:—

1. In a weighing scale in combination with a fulcrumed scale beam, an automatic load counterbalancing means therefor, of means for indicating the automatically counterbalanced load, of a tare beam carried by the main scale beam, of a poise slidable thereon, of a slidable rack carried by said tare beam and secured to said poise, and means for adjusting the rack longitudinally and thereby shifting the poise relatively to the beam fulcrum, said means comprising an operating member and a pinion meshing with the rack, said operating member and pinion being rotatively mounted upon said tare beam.

2. The invention set forth in claim 1 in which the operating member and pinion are substantially coaxially aligned with the main beam fulcrum for the purpose described.

3. In a weighing scale in combination with a fulcrumed scale beam, an automatic counterbalancing means therefor, of means for indicating the automatically counterbalanced load, of a tare device comprising a pair of tare beams attached to the main scale beam, of a rack member slidably guided by said beams, of a poise secured to said rack member, of an operating member for said rack, said operating member having a pinion coacting with the rack to drive the same upon the adjustment of the operating member, said operating member and pinion having their axes substantially co-axially aligned with the fulcrum of the main scale beam to minimize the disturbance of the equilibrium thereof when adjusting the operating member.

4. In a weighing scale in combination with a fulcrumed main scale beam and an automatic counterbalancing therefor, of means for indicating the automatically counterbalanced load, of a tare device comprising tare beams carried by the main beam, a pair of tare poises thereon, a rack to which said poises are connected, and an operating member carrying a pinion coacting with the said rack for displacing the same relatively to the tare beams, said operating member and pinion being substantially coaxially aligned with the fulcrum point of the main scale beam, whereby the equilibrium of the beam is substantially maintained during manipulative adjustment of the operating member.

5. A cumulative tare device for an automatic scale having a main scale beam, comprising, in combination, brackets carried by the beam, a tare beam comprising a pair of bars secured to said brackets, a rack slidably guided between said bars, a poise secured to said rack, a pinion journalled in said tare beam and meshing with the rack and an operating knob connected with the said pinion.

6. A cumulative tare device for an automatic scale having a fulcrumed main scale beam, a tare beam connected thereto and comprised of a pair of spaced parallel bars, of a rack guided for longitudinal movement by and disposed between the said bars, of a pair of poises slidable upon said tare beam, connected to the rack and disposed upon opposite sides of the fulcrum of the main beam, of a pinion axially aligned with the fulcrum of the main beam and meshing with the rack, and an operating knob connected to the said pinion for adjusting the poises for cumulative tare operations.

In testimony whereof I hereto affix my signature.

LOUIS A. OSGOOD.